United States Patent

Rahier et al.

[11] Patent Number: 6,120,745
[45] Date of Patent: Sep. 19, 2000

[54] METHOD FOR THE OXIDATION OF AT LEAST ONE ALKALI METAL

[75] Inventors: Andre Henri Alain Joseph Rahier, Wonck; Veerle Harriet Josepha Van Alsenoy, Wilryk, both of Belgium

[73] Assignee: Centre d'Etude de l'Energie Nucleaire, CEN, Brussels, Belgium

[21] Appl. No.: 09/002,929

[22] Filed: Jan. 5, 1998

[30] Foreign Application Priority Data

Jan. 15, 1997 [BE] Belgium .................................. 9700039

[51] Int. Cl.⁷ .............................. C01D 1/00; C01D 7/00; G21F 9/14
[52] U.S. Cl. ......................... 423/179; 423/421; 423/641; 423/DIG. 16; 588/11; 588/19
[58] Field of Search ..................... 423/179, 421, 423/641, DIG. 12, DIG. 16; 588/11, 19; 976/393, 394, 376

[56] References Cited

U.S. PATENT DOCUMENTS

| | | | |
|---|---|---|---|
| 3,202,477 | 8/1965 | Loeffler et al. | 23/63 |
| 4,062,926 | 12/1977 | Knight | 423/244 |
| 4,065,400 | 12/1977 | Bjorklund | 252/301.1 |
| 4,102,739 | 7/1978 | Sayre | 176/38 |
| 4,898,692 | 2/1990 | Rajan et al. | 252/629 |
| 5,348,689 | 9/1994 | Gay et al. | 588/18 |

FOREIGN PATENT DOCUMENTS

| | | |
|---|---|---|
| 0 596 331 | 5/1994 | European Pat. Off. . |
| 253520 | 1/1927 | United Kingdom . |
| 961160 | 6/1964 | United Kingdom . |

OTHER PUBLICATIONS

In re Edwards, 707 OG 312; 43 CCPA 884; 232 F.2d 641; 109 USPQ 380; p264–272, Apr. 1956.
Babor, J.A. , "Basic College Chemistry", p. 256, 1953.
*Chemical Abstracts*, vol. 98, No. 18, May 2, 1983, abstract No. 151626.
*Database WPI*, Section Ch, Week 8609, Derwent Publications Ltd., London, G.B.; AN 86–059981.

Primary Examiner—Steven P. Griffin
Assistant Examiner—Elin Warn
Attorney, Agent, or Firm—Bacon & Thomas

[57] ABSTRACT

Method for the oxidation of at least one alkali metal, according to which this alkali metal is subjected in molten condition to an oxidation by a reaction with oxygen, characterized in that the molten alkali metal is dispersed in a fluidized bed (6) and is subjected to an oxidation by a reaction with oxygen in this bed (6), whereby the oxides formed in this manner are subjected to a carbonation by a reaction with carbonic gas supplied to the aforementioned bed (6).

11 Claims, 1 Drawing Sheet

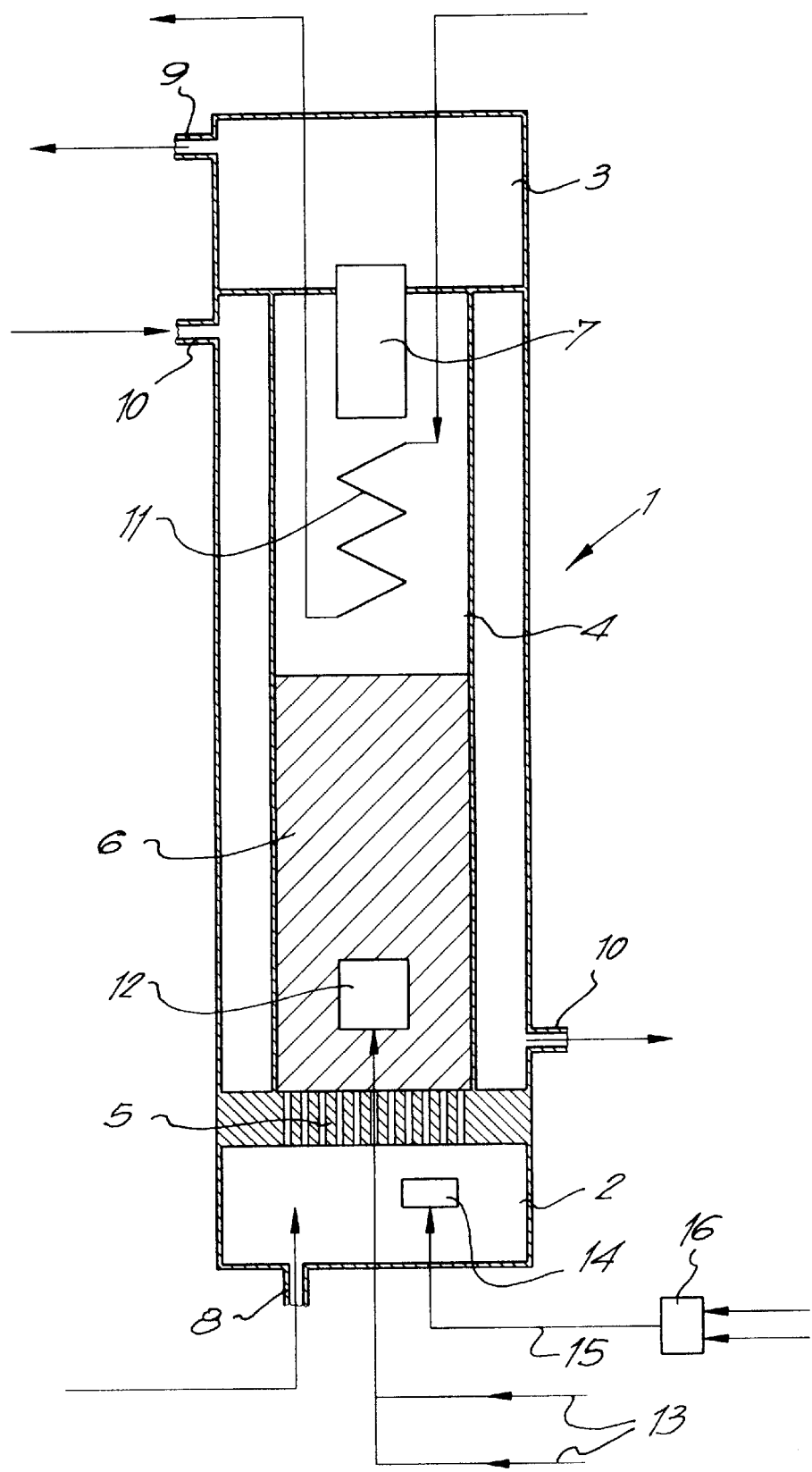

METHOD FOR THE OXIDATION OF AT LEAST ONE ALKALI METAL

BACKGROUND OF THE INVENTION

1. Field of the Invention

The present invention relates to a method for the oxidation of at least one alkaline metal, according to which this alkaline metal in molten condition is subjected to an oxidation by reaction with oxygen.

2. Discussion of the Related Art

The alkaline metal can be radioactive as well as non-radioactive.

The radioactive alkaline metals substantially are results of nuclear experiments, whereby they either have been brought into contact with radioactive isotopes or have been subjected to a neutronic flow, so that an activation was effected.

Generally, large quantities of alkaline metals are difficult to store for a longer period of time, as a result of the large reactivity which this metals show in respect to water and oxygen. Said reactions are extremely violent and carry along the risk of explosion as a result of the production of hydrogen in the case of reaction with water, or peroxides in the case of reactions with oxygen. Also, fires which cannot be controlled by classic means, as water is to be excluded, may occur. Moreover, the very exothermic character of this reactions even enhances the risks of an accident by explosion or fire.

Large quantities of such metals exist, however, particularly in the nuclear branch, where, for example, liquid sodium is used as a cooling fluid. The question of safe and efficient treatment of these metals, whether they are radioactive or not, is acute.

In fact, there exist various methods of treatment, but none guarantees a satisfactory level of total security, and none suggests a solution which is perfectly compatible to the necessary conditioning after treating, whereby this latter point is particularly crucial in the case of contaminated alkaline metals.

As the oxidation of alkali metals creates serious safety problems when an oxidant is used which contains hydrogen, such as water or alcohol, or an oxidant which is susceptible to combustion, such as alcohol, it is preferable to apply an oxidant which does not contain hydrogen and which is not combustible itself, in other words, oxygen.

Such a method is described in U.S. Pat. Nos. 1,685,520 and 2,825,629. This method is based upon the calcination of the metal by reaction with oxygen or air. It shows, however, the disadvantage that it does not oxidize the metal completely, as minor quantities of the latter do not react, due to the protection by oxidation on the surface, what maintains the aforementioned risks. The calcination also shows the risk of leading to the formation of peroxide which is known as unstable and which is also susceptible to provoking explosions.

The treatment of alkali metals according to the said method generally results indirectly in the production of hydroxides in aqueous solution after hydration of the oxides and peroxides. Moreover, the same hydroxides are formed directly when the oxidation is performed with water, or indirectly after hydrolisis of the ethyl alcohol in case of an oxidation with alcohol.

Whether the metals are radioactive or not, these hydroxides necessitate an additional treatment due to their corrosive character. This question is particularly acute in the case of treatment of radioactive metals, for which it is necessary to provide in a definitive conditioning which offers the prospect of a long-term storage.

SUMMARY OF THE INVENTION

The present invention aims precisely at a method for the oxidation of alkali metals which allows to work under clearly superior safety conditions, all this by guaranteeing an oxidation of the metals and preparing the stage of conditioning.

This aim is achieved by the fact that the molten alkali metal is dispersed in a fluidized bed and is subjected to an oxidation with oxygen in this bed, whereby the oxides formed in this manner are subjected to a carbonation by reaction with carbonic gas which is supplied to the aforementioned bed.

The oxides and peroxides, by and by, as they are formed as a result of the oxidation of the metal, react immediately with the $CO_2$ in order to form carbonates, which reduces the risks of explosion.

The turbulent character of the bed guarantees that the reactions are complete. In fact, the eventual oxide layer which might protect the metal is continuously broken up as a result of frequent shocks which the metal particles undergo with those of the bed.

The fluidization of the bed is obtained preferably by means of an ascending flow rate of an inert gas with which the oxygen and/or the carbonic gas possibly is mixed.

The metal can be injected by means of an atomizer in the form of droplets into the center of the fluidized bed itself.

Consequently, the thermic control of the reactions is excellent.

The temperature in the fluidized bed can be comprised between 50 and 700° C.

The formed carbonates can be extracted from the bed in view of their conditioning, or conditioned together with at least a portion of the solid particles forming the bed.

Especially in this last case, the fluidized bed contains solid particles of $SiO_2$, and possibly one or more oxides or carbonates, such as $CaO$, $CaCO_3$, $B_2O_3$, $Al_2O_3$, $MgO$, $MgCO_3$, $BaO$, $ZnO$, $ZnCO_3$, $PbO$, $PbCO_3$, $Fe_2O_3$, $TiO_2$, and $ZrO_2$.

As a result of the started reactions, the carbonates of alkaline metal accumulate in the bed which confers to the latter an ideal composition to be subjected to a subsequent vitrification. After the reaction, the contents of the bed can be vitrified in the interior of the fluidization reactor itself or can be transferred to another reactor to be subjected to the said vitrification.

This type of conditioning treatment is especially suitable for radioactive alkaline metals. In the case of nonradioactive alkaline metals, the vitrification is redundant, and the bed particles at the start of the treatment may be sand particles.

At the end of the treatment, the carbonates can also be extracted from the reactor by bringing them into an aqueaous solution. The effluents obtained in this manner do not show the disadvantage of being corrosive, whereas the treatment safety remains guaranteed. Eventually, the mixture of sand and carbonates themselves might be valorized, especially when the alkali metal is sodium.

BRIEF DESCRIPTION OF THE DRAWING

For clarity's sake, an example of a realization of the method for the oxidation of at least one alkali metal according to the invention is described hereafter, by means of example only and non-limitative, with reference to the accompanying drawing which shows in cross-section a reactor used for realization of the method according to the invention.

DESCRIPTION OF THE PREFERRED EMBODIMENT

This reactor is a fluidized-bed reactor, comprising a column 1 which is vertically divided into a lower entry section 2 an upper section 3 and an intermediate reaction section 4 which is closed at its lower extremity by a support 5 for the bed 6 and at its upper extremity by a cyclone 7.

This support 5 is a plate of perforated or porous metal or of porous ceramics.

A conduit 8 for the supply of fluidization gas opens into the lower section 2, whereas an evacuation conduit 9 of this gas comes out of the upper section 3.

The intermediate section 4 is provided with double walls, and the space between the walls is part of a cooling circuit 10.

A heat exchanger 11 can be mounted in the upper part of the intermediate reaction section 4.

In the lower part of this reaction section 4, there is an atomizer 12 of the bi-fluid type for molten alkaline metal. This atomizer 12 is provided with a calibrated internal orifice which allows a pre-dispersion of the alkaline metal, as well as of a set of calibrated external orifices for realizing the final dispersion. It can be heated by means of a heating resistance. It is supplied by two conduits 13 which traverse the support 5.

In this lower part or in the lower section 2, there is an injector 14 for the reactive gases which is connected by a conduit 15 to a mixing device 16.

According to the invention, for oxidizing a radioactive alkali metal or a mixture of radioactive alkaline metals by means of the aforementioned reactor, the procedure is as follows:

The reactive section 4 is filled approximately to medium height with oxide particles, particularly $SiO_2$, possibly mixed with other oxides and/or carbonates which form the bed 6.

The grain size distribution of the oxides or carbonates generally is such that the equivalent maximum diameter of the particles does not surpass 1 mm.

In particular, the bed 6 can be composed according to the table given hereafter:

| Oxides | Quantity % of mass i.r. to bed | Grain size distribution micrometers |
|---|---|---|
| $SiO_2$ | from 40 to 95 | from 0 to 1000 |
| CaO | from 0 to 25 | from 0 to 500 |
| $B_2O_3$ | from 0 to 30 | from 0 to 500 |
| $Al_2O_3$ | from 0 to 25 | from 0 to 500 |
| MgO | from 0 to 20 | from 0 to 300 |
| BaO | from 0 to 10 | from 0 to 300 |
| ZnO | from 0 to 20 | from 0 to 300 |
| PbO | from 0 to 40 | from 0 to 300 |
| $Fe_2O_3$ | from 0 to 3 | from 0 to 300 |
| $TiO_2$ | from 0 to 20 | from 0 to 300 |
| $ZrO_2$ | from 0 to 20 | from 0 to 300 |

Subsequently, the reactor is closed and the atomizer 12 is pre-heated up to a temperature of 50 to 200° C., whereafter it is maintained at a temperature above the fusion temperature of the alkali metal or the mixture of the alkaline metals to be treated.

Subsequently, inert gas is supplied through the supply conduit 8, forced through the support 5 which distributes this gas, and through the bed 6, and evacuated through the evacuation conduit 9.

The flow rate of the inert gas, for example, nitrogen, is between 0.1 and 5000 $m^3/h$ (calculated under normal temperature and pressure conditions) in function of the treatment capacity, and sufficient in order to obtain the fluidization of the bed 6.

The bed particles 6 of a size larger than 5 micrometers are confined to the reaction section 4 by means of the cyclone 7.

The oxygen and the carbonic gas are mixed. The mixture of this reactive gases is introduced through the conduit 15 and the injector 14 into the lower section 2, below the support 5, where it mixes with the inert fluidization gas.

Then, the radioactive alkali metal which is molten and, consequently, liquid, is injected in the form of droplets into the center of the bed 6 by means of the atomizer 12, which has the effect of provoking a temperature increase of the reaction section 4. A pre-dispersion takes place in the interior of the atomizer 12. The maximum flow rate of the alkali metal is 360 kg/h.

This reaction section 4 is immediately cooled by a heat transfer medium circulating through the cooling circuit 10 and possibly through the heat exchanger 11 which is particularly useful when the internal diameter of the reaction section surpasses 0.3 m.

The different flow rates are adjusted in such a manner that the operating temperature of the reaction section 4 should be comprised between 50 and 700° C.

During treatment, the alkaline metal is oxidized and, by means of reacting with the carbonic gas, transformed to carbonate.

The treatment is stopped when, due to the reactions, the composition of the bed 6 obtains the desired composition for the following step of preparation, in other words, the vitrification.

This composition is normally obtained when the percentage of equivalent oxide to alkali metal reaches 10 to 45% of the mass of the total of equivalent oxides in the bed 6.

The total bed 6 is vitrified.

By means of illustration, a concrete example of the treatment of radioactive sodium is given hereafter.

A flow rate of 360 g/h of molten sodium is treated in the aforementioned reactor which has a reaction zone 4 of 2 m in height and of 0.2 m internal diameter.

The composition of the bed 6 before the treatment is the following: 84% of $SiO_2$, 3% of $Al_2O_3$, 8% of CaO and 5% of MgO (% of mass referring to the sum of equivalent oxides, whereby the two latter oxides are introduced in the form of carbonates).

The flow rate of inert fluidization gas is 0.5 $m^3/h$ or more.

The flow rates are adjusted in such a manner that the temperature in the interior of the reaction section 4 is between 200 and 350° C. In this case, the thermic power of the reactor is approximately 1700 W.

The treatment is stopped after approximately 20 hours.

The treatment of one or more non-radioactive alkaline metals is performed exactly in the same manner, with the difference that the composition of the bed 6 before the treatment is 100% $SiO_2$, whereas the preparation does not comprise a vitrification, but the putting in an aqueous solution of alkali carbonates.

Consequently, the treatment can pursued beyond the aforementioned limit of the radioactive alkali metals.

It is evident that numerous modifications can be made to the above-described examples, however, without leaving the scope of the invention.

In particular, the oxygen and/or the carbonic gas can be mixed with the fluidization gas outside of the reactor.

What is claimed is:

1. A method for the oxidation of at least one alkali metal, which comprises subjecting the alkali metal in a molten condition to an oxidation by a reaction with oxygen, wherein the molten alkali metal is dispersed in a fluidized bed and is subjected to the oxidation by reaction with oxygen in the bed, whereby the oxides formed in this manner are subjected to a carbonation by a reaction with carbonic gas supplied to the bed, and wherein the alkali metal is injected by means of an atomizer in the form of droplets in the center of the fluidized bed.

2. Method according to claim 1, wherein the fluidization of the bed (6) is obtained by means of an ascending flow rate of an inert gas.

3. Method according to claim 1, wherein a pre-atomization of the alkaline metal takes place in the interior of the a tomizer (12).

4. Method according to claim 1, wherein before and optionally at the beginning of the treatment, the atomizer (12) is pre-heated to a temperature of 50 to 200° C.

5. Method according to claim 1 wherein the oxygen and the carbonic gas are injected in the form of a dosed mixture.

6. Method according to claim 1 wherein the temperature in the fluidized bed (6) is limited to 50 to 700° C. by means of cooling.

7. Method according to claim 1 wherein the formed carbonates are extracted from the bed (6) in order to condition them.

8. Method according to claim 7, wherein the formed carbonates are extracted from the bed (6) by bringing them into an aqueous solution.

9. Method according to claim 1 wherein the formed carbonates are conditioned together with at least one portion of solid particles forming the bed (6).

10. Method according to claim 9, wherein the formed carbonates and at least a portion of the bed (6) are vitrified.

11. Method according to claim 1 wherein the fluidized bed (6) contains solid particles of $SiO_2$, and one or more oxides or carbonates, of the series formed by the following compounds: $CaO$, $CaCO_3$, $B_2O_3$, $Al_2O_3$, $MgO$, $MgCO_3$, $BaO$, $ZnO$, $ZnCO_3$, $PbO$, $PbCO_3$, $Fe_2O_3$, $TiO_2$, and $ZrO_2$.

* * * * *